UNITED STATES PATENT OFFICE.

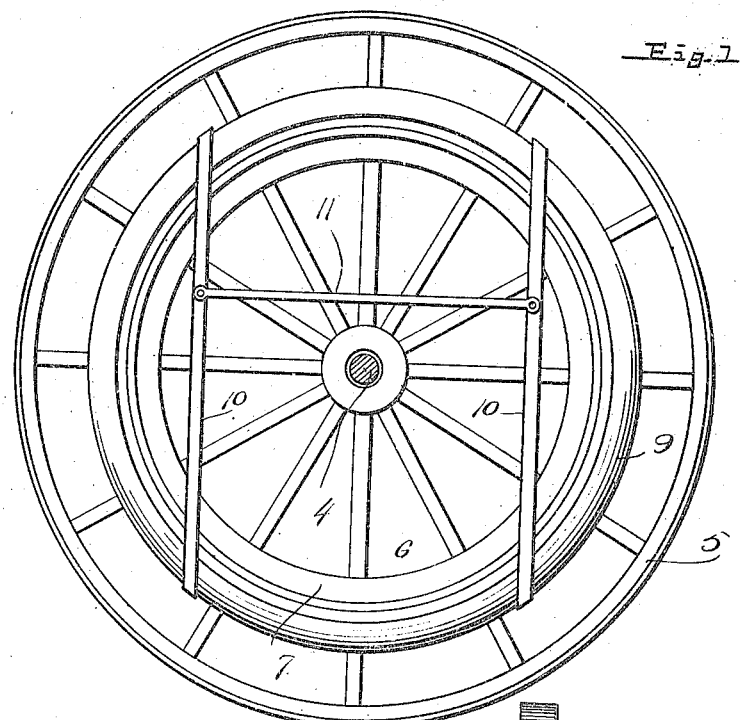
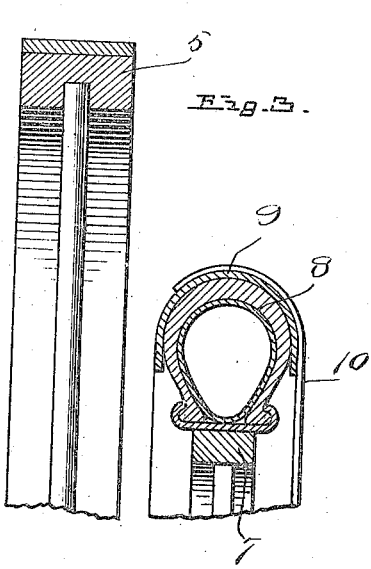
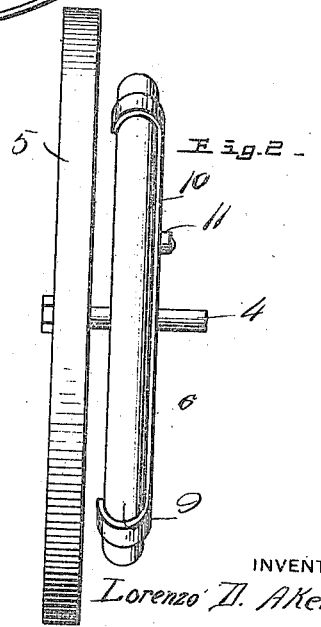

LORENZO D. AKERS, OF PRAIRIE VIEW, KANSAS.

CUSHIONING-WHEEL FOR VEHICLES.

1,248,775.　　　　　Specification of Letters Patent.　　Patented Dec. 4, 1917.

Application filed July 29, 1916. Serial No. 112,056.

*To all whom it may concern:*

Be it known that I, LORENZO D. AKERS, a citizen of the United States, residing at Prairie View, in the county of Phillips and State of Kansas, have invented certain new and useful Improvements in Cushioning-Wheels for Vehicles, of which the following is a specification.

This invention relates to vehicles, and particularly to cushioning means therefor.

The primary object of the invention is to provide means whereby the vehicle body may be supported upon the axle in such manner as to be cushioned from the shocks to which the axle is subjected during travel over rough roads, and whereby wear and tear to the cushioning element is obviated.

A further object of the invention is to provide an improved cushioning element adapted for use in connection with vehicles employing wheels of a non-resilient or cushioning nature, whereby the expense and other disadvantages common to the now well known and used pneumatic tires is obviated.

A still further and particular object of the invention is to provide a device of the character above briefly referred to which is of simple and inexpensive construction, which is composed of but few readily assembled parts, all so constructed and arranged as to preclude wear, breakage, or derangement of the same, which is proof against becoming disordered, and which will prove very efficient in the attainment of the ends for which it is designed.

With these objects in view, together with others which will appear as the description proceeds, the invention resides in the novel formation, combination, and arrangement of parts, all as will be described more fully hereinafter, illustrated in the drawings, and particularly pointed out in the claim.

The invention will be best understood by reference to the accompanying drawings, wherein:—

Figure 1 is a sectional view taken through the axle of a conventional form of vehicle and looking in the direction of the wheel, the said axle being shown as equipped with a cushioning device constructed in accordance with my invention;

Fig. 2 is an edge elevation of the traction and cushioning wheels; and

Fig. 3 is an enlarged fragmentary section taken through portions of the wheels.

Referring now more particularly to the drawings, 4 indicates the axle of a vehicle, to the spindle of which is secured the traction or supporting wheel 5. This wheel as shown in the present instance is of that type commonly used on ordinary wagons, the same being provided with the usual metallic or non-cushioning tire. If desired, however, this wheel may be equipped with a solid rubber tire to assist in cushioning the jolts and shocks to which the wheel may be subjected.

The cushioning means resides in arranging upon the axle 4, a cushioning wheel 6, the latter being maintained upon the axle against rotation. This cushioning wheel is of less diameter than the traction wheel, and does not engage with the ground. The cushioning wheel is preferably formed with a rim 7 provided with the usual well known pneumatic tire 8, the latter being secured to the rim in any approved manner. A metallic shell or casing 9 is arranged over and snugly fitted upon the pneumatic tire 8, and cross bars 10 extend from side to side of the wheel, and are connected by a strut 11. The bars 10 and strut 11 form a suitable frame to which the vehicle body may be connected. Preferably, the extremities of the bars 10 are hooked as shown in order that they may firmly engage with the shell or casing 9. The shell may be equipped upon its interior surface with lateral grooves, within which tread portions of the pneumatic tire may engage to prevent rotary movement of the tire and shell relative to each other.

In practice, a cushioning wheel of the above described construction is arranged upon each end of the axles of the vehicle, and preferably in close proximity to the traction wheels. The body of the vehicle is bolted or in any other preferred manner secured to the cushioning wheels by means of the frames formed of the bars 10 and struts 11. The weight of the vehicle body is thus held suspended upon the pneumatic tire of the cushioning wheel, and vibrations and shocks prevalent in the vehicle axles will be prevented from being transmitted to the body.

It is thus seen that an adequate means is provided for obviating the disadvantages and expense incident to the use of pneumatic tires upon the traction wheels of vehicles. The shell or casing 9, in addition to providing a supporting surface for the vehicle body, houses and protects the inflated cushioning member, and prevents the same from becoming ruptured or broken.

While the above is a description of the preferred embodiment of the invention, it is obvious that various changes in the minor details of construction and arrangement of parts may be resorted to if desired without departing from the spirit of the invention or exceeding the scope of the claim.

What is claimed is:—

The combination with a vehicle axle, of a cushioning wheel of less diameter than the traction wheel of the vehicle supported upon the axle of said vehicle, a cushion tire on said cushioning wheel, an annular shell inclosing said cushion tire, and frame bars extending across said shell, the bars being adapted to support the body of said vehicle, substantially as described.

In testimony whereof I affix my signature in presence of two witnesses.

LORENZO D. AKERS.

Witnesses:
CLARENCE HADLEY,
E. G. DE YOUNG.